United States Patent [19]

Murata et al.

[11] Patent Number: 6,150,053
[45] Date of Patent: Nov. 21, 2000

[54] NON-AQUEOUS ELECTROLYTE SECONDARY BATTERY

[75] Inventors: Toshihide Murata, Izumiotsu; Yasuhiko Bito, Minamikawachi-gun; Shuji Ito, Akashi; Yoshinori Toyoguchi, Yao; Toshitada Sato, Kadoma, all of Japan

[73] Assignee: Matsushita Electric Industrial Co., Ltd., Osaka-fu, Japan

[21] Appl. No.: 09/086,844

[22] Filed: May 29, 1998

[30] Foreign Application Priority Data

Jun. 6, 1997 [JP] Japan .................................. 9-149121
Oct. 22, 1997 [JP] Japan .................................. 9-289426

[51] Int. Cl.$^7$ .................................................. H01M 4/62
[52] U.S. Cl. ...................... 429/218.1; 429/188; 429/320; 429/232
[58] Field of Search .................................... 429/188, 320, 429/218.1, 232; 252/62.2

[56] References Cited

U.S. PATENT DOCUMENTS

| | | |
|---|---|---|
| 4,478,921 | 10/1984 | Langan . |
| 4,524,115 | 6/1985 | Paulson et al. . |
| 4,800,143 | 1/1989 | Harbach et al. . |
| 4,913,988 | 4/1990 | Langan . |
| 5,047,301 | 9/1991 | Adlhart et al. . |
| 5,114,432 | 5/1992 | Plichta et al. . |
| 5,114,811 | 5/1992 | Ebel et al. . |

FOREIGN PATENT DOCUMENTS

| | | |
|---|---|---|
| 0 503 901 A1 | 9/1992 | European Pat. Off. . |
| 0 536 425 A1 | 4/1993 | European Pat. Off. . |
| 0 631 339 A2 | 12/1994 | European Pat. Off. . |
| 0 687 025 A1 | 12/1995 | European Pat. Off. . |
| 0 689 255 A2 | 12/1995 | European Pat. Off. . |
| 853 347 A1 | 7/1998 | European Pat. Off. . |
| 196 54 057 A1 | 6/1998 | Germany . |
| 6-275277 | 9/1994 | Japan . |
| 7-134985 | 5/1995 | Japan . |
| 07249431 | 9/1995 | Japan . |
| 07288127 | 10/1995 | Japan . |
| 8-031407 | 2/1996 | Japan . |
| 09045371 | 2/1997 | Japan . |

*Primary Examiner*—Carol Chaney
*Assistant Examiner*—Susy Tsang
*Attorney, Agent, or Firm*—Akin, Gump, Strauss, Hauer & Feld, L.L.P.

[57] ABSTRACT

A non-aqueous electrolyte secondary battery is disclosed, which hardly causes deterioration of its properties at high temperatures. The battery has a chargeable and dischargeable cathode, a chargeable and dischargeable anode, and a non-aqueous electrolyte and includes a substance which produces water with an increase in temperature in any one of the cathode, the anode, the non-aqueous electrolyte, other elements, and voids in the battery. Examples of the substance which produces water include hydroxides and compounds having water of crystallization.

6 Claims, 10 Drawing Sheets

NON-AQUEOUS ELECTROLYTE SECONDARY BATTERY

BACKGROUND OF THE INVENTION

The present invention relates to a non-aqueous electrolyte secondary battery that keeps the favorable cell performances and has the enhanced high-temperature storage properties and high energy density.

Non-aqueous electrolyte secondary batteries using an alkali metal, such as lithium or sodium, as a negative electrode or an anode are intensively studied since they have a high electromotive force and are expected to have a higher energy density than conventional nickel-cadmium storage batteries and lead-acid storage batteries. Especially the non-aqueous electrolyte secondary batteries using Li as the anode have been practically applied for power sources of portable cordless apparatuses, such as information and communication apparatuses and audio-visual apparatuses, and mass-produced.

The practical non-aqueous electrolyte secondary batteries use a carbon material as the anode and $LiCoO_2$ as a positive electrode or a cathode. Studies and researches are concentrated on the materials of the cathode and the anode, in order to further reduce the cost and enhance the energy density.

Development of new materials which are manufactured at low cost and have high performances will expand the application of the non-aqueous electrolyte secondary batteries to a variety of fields, such as electric vehicles, as well as the current small-sized portable apparatuses.

The allowable temperature range of commercially available non-aqueous electrolyte secondary batteries is $-20°$ C. to $60°$ C. Under the conditions of conventional applications, the batteries are used at or around room temperature, so that no significant problems have arisen with respect to the temperature. The future expansion of their applications may, however, cause the batteries to be used in severer conditions.

A lithium secondary battery, which is a currently available non-aqueous electrolyte secondary battery, internally produces heat during discharge. The small-sized battery produces only a small quantity of heat and has favorable radiation of heat from the surface of the battery. The large-sized battery used, for example, for electric vehicles to generate a large amount of electricity, on the other hand, produces a greater quantity of heat than the quantity of radiation and may temporarily has a high internal temperature. The battery is also exposed to high temperatures when being applied to apparatuses which produce heat.

In case that the lithium secondary battery under the charged condition is exposed to high temperatures, the properties of the battery drastically deteriorate due to the expected reaction of an active material in the charged state with a non-aqueous electrolyte. The once deteriorating battery due to the high temperatures does not recover its properties.

It is accordingly required to prevent deterioration of the properties due to the heat when the non-aqueous electrolyte secondary battery is applied to the conditions of high temperatures.

BRIEF SUMMARY OF THE INVENTION

The object of the present invention is thus to provide a non-aqueous electrolyte secondary battery which hardly causes deterioration of its properties when being temporarily exposed to high temperatures.

The present invention provides a non-aqueous electrolyte secondary battery that includes a substance, which produces either one of water and gaseous carbon dioxide with an increase in temperature, in the battery or more specifically in any one of power generating elements, such as a cathode, an anode, and a non-aqueous electrolyte, voids in the battery, and other elements incorporated in the battery.

The substance which produces water may be any compound that produces water through chemical reactions, any compound which contains water, any substance on which water is adsorbed, any capsular or saccular structure which contains water therein, or any other substance which eventually evolves water.

The substance which produces gaseous carbon dioxide may be any carbonate or hydrogencarbonate.

The present invention is also directed to a non-aqueous electrolyte secondary battery having a chargeable and dischargeable cathode, a chargeable and dischargeable anode, and a non-aqueous electrolyte, wherein any one of the cathode, the anode, and the non-aqueous electrolyte includes at least one compound selected from the group consisting of aluminum compounds, nickel compounds, and cobalt compounds.

The non-aqueous electrolyte secondary battery of the present invention hardly causes deterioration of its properties even when the battery is temporarily exposed to high temperatures.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
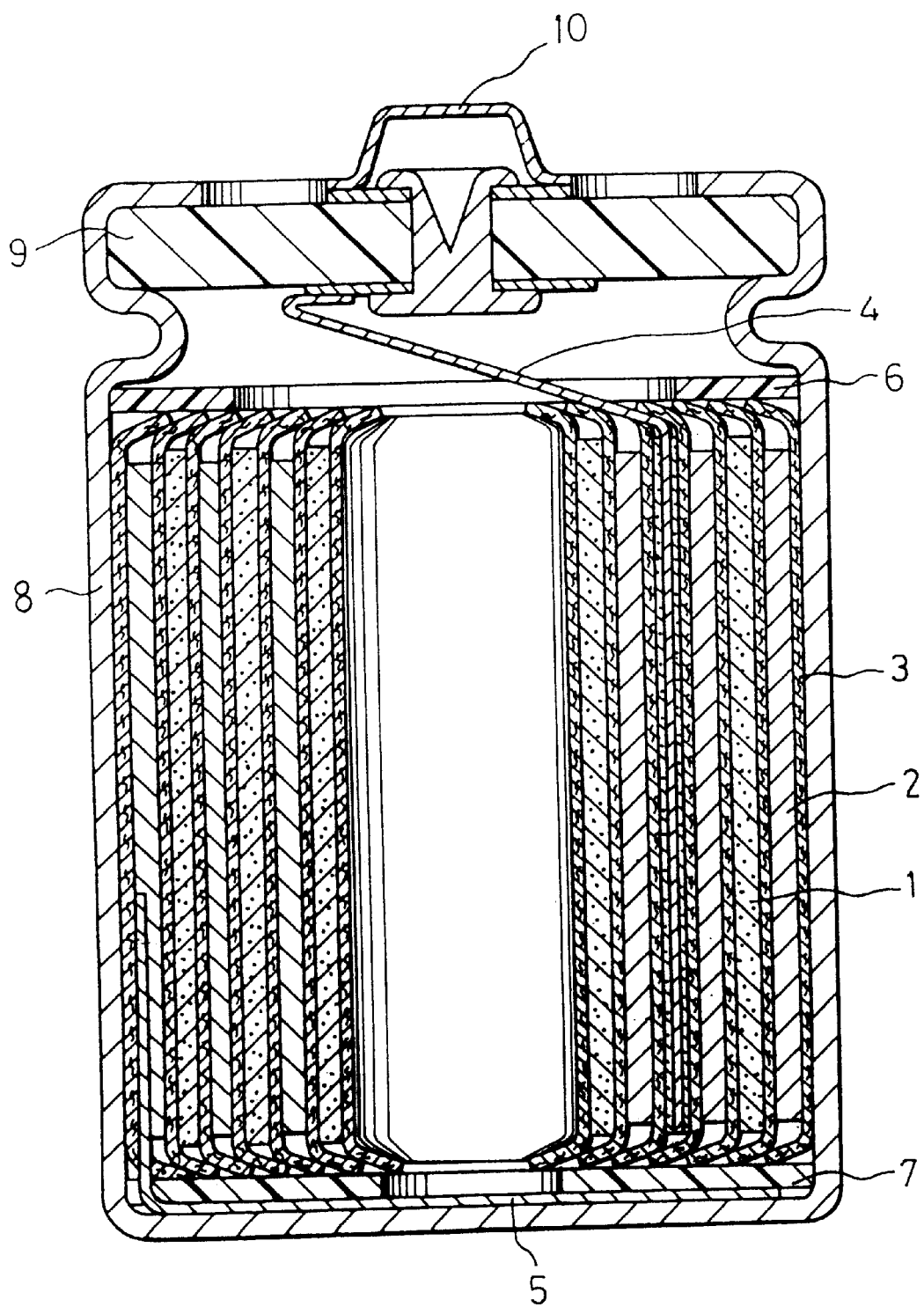
FIG. 1 is a vertical sectional view schematically illustrating a non-aqueous electrolyte secondary battery embodying the present invention.

The battery of the present invention includes a substance which produces either water or gaseous carbon dioxide with an increase in temperature.

When the temperature of the battery under the charged condition increases, an electrode active material in the charged state reacts with an electrolyte at the interface thereof. This deteriorates the active material and lowers the capacity of the battery. The reaction is exothermic and increases the temperature at the interface. The temperature increase further accelerates the reaction.

In case that the battery includes a substance which produces water with an increase in temperature, a little amount of water is produced in the vicinity of the interface where the reaction of deteriorating the active material proceeds, and interferes with the reaction. Namely water prevents the reaction of deteriorating the active material from being accelerated. The battery including the substance which produces water with an increase in temperature enables the properties of the battery to be substantially kept even under the condition of a temporary increase in internal temperature of the battery.

In case that the battery includes a substance which produces inert gaseous carbon dioxide with an increase in temperature, the substance existing in the vicinity of the interface, where the active material in the charged state reacts with the electrolyte, produces gaseous carbon dioxide with an increase in temperature. The gaseous carbon dioxide prevents the active material from coming into contact with the electrolyte and interferes with the further reaction, thereby preventing deterioration of the properties of the battery.

It is preferable that the substance produces water at temperatures of not lower than 60° C. The substance which produces water at relatively low temperatures of less than 60° C. undesirably produces water in the drying step of the electrode manufacturing process and does not produce any water in the actual state of temperature increase. The temperature of the drying step of the electrode manufacturing process may be lowered. The substance, however, still produces water in the normally applied temperature range and may adversely affect the properties of the battery. The substance which produces water at temperatures of higher than 300° C., on the other hand, can not sufficiently exert its effects but causes deterioration of the battery.

The preferable upper limit of the temperature at which the substance produces water is 250° C. or less, more specifically 150° C. or less.

Typical examples of the substance which produces water with an increase in temperature include hydroxides, boric acid containing OH like hydroxides, and compounds having water of crystallization.

Favorable examples of the hydroxides include zinc hydroxide, aluminum hydroxide, cadmium hydroxide, chromium hydroxide, cobalt hydroxide, nickel hydroxide, manganese hydroxide, calcium hydroxide, magnesium hydroxide, zirconium hydroxide, iron hydroxide oxide, and nickel hydroxide oxide.

Favorable examples of the compounds having water of crystallization include hydrous aluminum oxide, hydrous barium sulfate, hydrous calcium sulfate, hydrous cobalt phosphate, hydrous antimony oxide, hydrous tin oxide, hydrous titanium oxide, hydrous bismuth oxide, and hydrous tungsten oxide.

In case that the substance which produces water with an increase in temperature is contained in either the cathode or the anode, the content is preferably 0.5 to 20 parts by weight per 100 parts by weight of the active material of the corresponding electrode.

In case that the substance which produces water with an increase in temperature is contained in the non-aqueous electrolyte, the content is preferably 0.5 to 30 parts by weight per 100 parts by weight of the non-aqueous electrolyte.

It is preferable that the substance produces gaseous carbon dioxide at temperatures of not lower than 80° C. The substance which produces carbon dioxide at temperatures of lower than 80° C. may produce gaseous carbon dioxide in the normally applied temperature range. The substance which produces carbon dioxide at temperatures of higher than 300° C., on the other hand, can not sufficiently exert its effects but causes deterioration of the battery.

The preferable upper limit of the temperature at which the substance produces gaseous carbon dioxide is 250° C. or less, more specifically 150° C. or less.

Typical examples of the substance which produces gaseous carbon dioxide with an increase in temperature include carbonates and hydrogencarbonates. Preferable examples of the carbonates and hydrogencarbonates include sodium carbonate, potassium carbonate, rubidium carbonate, calcium carbonate, magnesium carbonate, barium carbonate, cobalt carbonate, iron carbonate, nickel carbonate, zinc carbonate, sodium hydrogencarbonate, potassium hydrogencarbonate, rubidium hydrogencarbonate, and cesium hydrogencarbonate.

In case that the substance which produces gaseous carbon dioxide with an increase in temperature is contained in either the cathode or the anode, the content is preferably 0.5 to 25 parts by weight per 100 parts by weight of the active material of the corresponding electrode.

In case that the substance which produces gaseous carbon dioxide with an increase in temperature is contained in either the non-aqueous electrolyte or a separator, the content is preferably 0.5 to 30 parts by weight per 100 parts by weight of the non-aqueous electrolyte.

The inventors of the present invention have found that aluminum compounds, nickel compounds, and cobalt compounds, which do not produce water or gaseous carbon dioxide, also interfere with the reaction of the active material in the charged state with the electrolyte.

Preferable examples of the aluminum compounds include aluminum oxide, aluminum sulfate, aluminum phosphate, and aluminum chloride.

Preferable examples of the nickel compounds include nickel oxide, nickel sulfate, nickel phosphate, and nickel carbonate.

Preferable examples of the cobalt compounds include cobalt oxide, cobalt sulfate, cobalt phosphate, cobalt carbonate, and cobalt oxalate.

It is preferable that any one of these aluminum compounds, nickel compounds, and cobalt compounds is added to either the cathode or the anode.

In case that such a compound is contained in either the cathode or the anode, the content is preferably 0.5 to 20 parts by weight per 100 parts by weight of the active material of the corresponding electrode.

The following compounds other than the above compounds may be added to the electrolyte: aluminum acetate, aluminum oxalate, nickel perchlorate, nickel nitrate, nickel acetate, cobalt acetate, and cobalt perchlorate.

In case that such a compound is contained in the non-aqueous electrolyte, the content is preferably 0.5 to 30 parts by weight per 100 parts by weight of the non-aqueous electrolyte.

The present invention is described in detail according to some examples, although the present invention is not restricted to these examples.

EXAMPLE 1

In this example, a variety of hydroxides and boric acid were used as the substance which produces water with an increase in temperature and added to the cathode material mixture. A cylindrical battery shown in FIG. 1 was used for evaluation.

The following describes the process of manufacturing a battery.

The cathode active material used here was $LiNiO_2$, which was synthesized by mixing $LiNO_3$ and $Ni(OH)_2$ at a predetermined molar ratio and heating the mixture at 650° C. in the oxygen atmosphere. The active material was classified to have the diameter of not greater than 45 μm.

After 10 g of carbon powder as a conductive agent, 8 g of polytetrafluoroethylene as a binder, and a petroleum solvent were added to 100 g of the cathode active material and stirred well to yield a paste, 5 g of each compound shown in Table 1 was further added to the paste. Each resultant paste was applied on a titanium core member, dried at 95° C., rolled, and cut to a predetermined size as a cathode plate. The weight of the active material in the cathode was 3 g.

A cathode plate of comparative example was prepared in the same manner as in above without any additive.

Carbon powder having a discharge capacity of 300 mAh per gram was used as the anode active material. A paste-like mixture was obtained by adding styrene-butadiene rubber as a binder and a petroleum solvent to 100 g of the carbon powder and stirring the mixture well. The mixing ratio of the carbon powder to the binder was 100 to 5 as the weight of the solid component.

The paste was applied on a copper core member, dried at 95° C., rolled, and cut to a predetermined size as an anode plate. The weight of carbon in the anode was 2 g.

The non-aqueous electrolyte used in this example was prepared by dissolving 1 mol/l lithium perchlorate in a mixed solution of ethylene carbonate and dimethoxyethane in an equivolumetric ratio. A microporous polypropylene film was used as the separator.

The batteries were assembled in the following manner.

A positive lead conductor 4 and a negative lead conductor 5 composed of the same materials as those of the respective core members were attached to a cathode plate 1 and an anode plate 2 by spot welding. An electrode assembly was prepared by spirally winding the cathode plate 1 and the anode plate 2 via a porous polypropylene separator 3 having a wider width than those of the cathode plate 1 and the anode plate 2. The electrode assembly was inserted into a battery case 8 and covered with polypropylene insulators 6 and 7 disposed on the top and the bottom of the electrode assembly. After a rolled groove was formed at the shoulder of the battery case 8, a non-aqueous electrolyte was injected into the battery case 8. The quantity of the electrolyte injected was 2.6 ml. The opening of the battery case 8 was sealed with a sealing plate 9 with a positive terminal 10.

Each battery thus assembled was subjected to a high-temperature durability test. The battery was charged to 4.2 volt and subsequently discharged to 3 volt at a constant current of 0.5 mA at 20° C. This charge-discharge cycle was repeated ten times. After completion of charging in the eleventh cycle, the battery was kept at 150° C. for two minutes. The battery was then discharged under the same conditions at 20° C. The capacity maintenance rate is defined as:

Capacity maintenance rate=100 ((Quantity of discharged electricity in eleventh cycle/Quantity of discharged electricity in tenth cycle)

After completion of discharging in the eleventh cycle, the battery was charged again and the discharge capacity was evaluated. The capacity recovery rate is defined as:

Capacity recovery rate=100 ((Quantity of discharged electricity in twelfth cycle/Quantity of discharged electricity in tenth cycle)

The capacity maintenance rate and the capacity recovery rate after the high-temperature durability test of the respective batteries are shown in Table 1.

TABLE 1

|   | Capacity maintenance rate (%) | Capacity recovery rate (%) |
| --- | --- | --- |
| $Zn(OH)_2$ | 90 | 97 |
| $Al(OH)_3$ | 92 | 98 |
| $Cd(OH)_2$ | 90 | 96 |
| $Cr(OH)_2$ | 91 | 98 |
| $Co(OH)_2$ | 92 | 98 |
| $Ni(OH)_2$ | 91 | 98 |
| $Mn(OH)_2$ | 90 | 97 |
| $Ca(OH)_2$ | 91 | 97 |
| $Mg(OH)_2$ | 92 | 97 |
| $Zr(OH)_4$ | 92 | 98 |
| FeOOH | 91 | 98 |
| NiOOH | 92 | 98 |
| $H_3BO_3$ | 90 | 96 |
| No additive (Comparative example) | 56.0 | 45.4 |

The battery of the comparative example with neither hydroxide nor boric acid being added to the cathode material mixture showed a significant decrease in capacity after the test and had a low capacity maintenance rate. The battery still had a low capacity even after being charged; that is, the battery had a low capacity recovery rate. The batteries of Example 1 with one of the hydroxides or boric acid being added to the cathode material mixture, on the other hand, had both a high capacity maintenance rate and a high capacity recovery rate. This elucidates that addition of a compound which produces water with an increase in temperature, especially an OH-containing hydroxide or boric acid, to the cathode material mixture effectively prevents a decrease in capacity due to exposure of the battery to high temperatures. It is considered that water thus produced interferes with the reaction of the active material in the charged state with the electrolyte which causes deterioration of the cell performances.

EXAMPLE 2

In this example, a variety of hydroxides and boric acid were used as the substance which produces water with an increase in temperature and added to the anode material mixture.

Like Example 1, $LiNiO_2$ classified to have the diameter of not greater than 45 μm was used as the cathode active material. Ten grams of carbon powder, eight grams of polytetrafluoroethylene, and a petroleum solvent were added to 100 g of the cathode active material and stirred well to yield a paste. The paste was applied on a titanium core member, dried at 95° C., rolled, and cut to a predetermined size as a cathode plate. The weight of the active material in the cathode was 3 g.

The same carbon powder as Example 1 was used for the anode. After a paste-like mixture was obtained by adding styrene-butadiene rubber and a petroleum solvent to 100 g of the carbon powder and stirring the mixture well, 5 g of each compound shown in Table 2 was further added to the paste-like mixture. The mixing ratio of the carbon powder to the binder was 100 to 5 as the weight of the solid component. Each resultant paste was applied on a copper core member, dried at 95° C., rolled, and cut to a predetermined size as an anode plate. The weight of carbon in the anode was 2 g.

The batteries were assembled in the same manner as in Example 1 except the difference in cathode and anode and subjected to the high-temperature durability test. The capacity maintenance rate and the capacity recovery rate after the high-temperature durability test of the respective batteries are shown in Table 2.

TABLE 2

|  | Capacity maintenance rate (%) | Capacity recovery rate (%) |
| --- | --- | --- |
| $Zn(OH)_2$ | 91 | 98 |
| $Al(OH)_3$ | 92 | 98 |
| $Cd(OH)_2$ | 91 | 98 |
| $Cr(OH)_2$ | 91 | 98 |
| $Co(OH)_2$ | 92 | 98 |
| $Ni(OH)_2$ | 92 | 98 |
| $Mn(OH)_2$ | 91 | 97 |
| $Ca(OH)_2$ | 90 | 97 |
| $Mg(OH)_2$ | 91 | 97 |
| $Zr(OH)_4$ | 92 | 98 |
| $FeOOH$ | 91 | 98 |
| $NiOOH$ | 92 | 98 |
| $H_3BO_3$ | 92 | 98 |

The batteries of Example 2 with one of the hydroxides or boric acid being added to the anode material mixture had both a high capacity maintenance rate and a high capacity recovery rate. This elucidates that addition of a compound which produces water with an increase in temperature, especially an OH-containing hydroxide or boric acid, to the anode material mixture effectively prevents a decrease in capacity due to exposure of the battery to high temperatures. It is considered that water thus produced interferes with the reaction of the active material in the charged state with the electrolyte which causes deterioration of the cell performances.

EXAMPLE 3

In this example, a variety of compounds having water of crystallization were used as the substance which produces water with an increase in temperature and added to the cathode material mixture.

The batteries were assembled in the same manner as in Example 1, except that the compounds having water of crystallization shown in Table 3 were applied for the cathode, instead of the hydroxides or boric acid.

The capacity maintenance rate and the capacity recovery rate after the high-temperature durability test of the respective batteries are shown in Table 3. The batteries of Example 3 had both a high capacity maintenance rate and a high capacity recovery rate. It is considered that water produced interferes with the reaction of the active material in the charged state with the electrolyte which causes deterioration of the cell performances.

TABLE 3

|  | Capacity maintenance rate (%) | Capacity recovery rate (%) |
| --- | --- | --- |
| $Al_2O_3.3H_2O$ | 92 | 98 |
| $Ba(NO_3)_2.H_2O$ | 91 | 97 |
| $CaSO_4.2H_2O$ | 90 | 96 |
| $Co_3(PO_4)_2.8H_2O$ | 90 | 97 |
| $Sb_2O_5.2H_2O$ | 92 | 98 |
| $SnO.H_2O$ | 91 | 98 |
| $TiO_2.2H_2O$ | 91 | 97 |
| $Bi_2O_4.2H_2O$ | 91 | 98 |
| $WO_3.H_2O$ | 90 | 98 |

EXAMPLE 4

In this example, a variety of compounds having water of crystallization were used as the substance which produces water with an increase in temperature and added to the anode material mixture.

The batteries were assembled in the same manner as in Example 2, except that the compounds having water of crystallization shown in Table 4 were applied for the anode, instead of the hydroxides or boric acid.

The capacity maintenance rate and the capacity recovery rate after the high-temperature durability test of the respective batteries are shown in Table 4. The batteries of Example 4 had both a high capacity maintenance rate and a high capacity recovery rate.

TABLE 4

|  | Capacity maintenance rate (%) | Capacity recovery rate (%) |
| --- | --- | --- |
| $Al_2O_3.3H_2O$ | 92 | 98 |
| $Ba(NO_3)_2.H_2O$ | 91 | 97 |
| $CaSO_4.2H_2O$ | 90 | 97 |
| $Co_3(PO_4)_2.8H_2O$ | 92 | 98 |
| $Sb_2O_5.2H_2O$ | 91 | 98 |
| $SnO.H_2O$ | 91 | 98 |
| $TiO_2.2H_2O$ | 92 | 97 |
| $Bi_2O_4.2H_2O$ | 91 | 98 |
| $WO_3.H_2O$ | 91 | 98 |

EXAMPLE 5

In this example, a variety of hydroxides were used as the substance which produces water with an increase in temperature and added to the electrolyte.

The electrolyte used in this example was prepared by dissolving 1 mol/l lithium perchlorate in a mixed solution of ethylene carbonate and dimethoxyethane in an equivolumetric ratio. Each hydroxide shown in Table 5 was added to the electrolyte at the ratio of 3 parts by weight per 100 parts by weight of the electrolyte. It is not necessary to dissolve the additive in the electrolyte.

The batteries including the cathode and the anode of the comparative example were assembled and evaluated in the same manner as in Example 1.

The capacity maintenance rate and the capacity recovery rate after the high-temperature durability test of the respective batteries are shown in Table 5.

TABLE 5

| | Capacity maintenance rate (%) | Capacity recovery rate (%) |
|---|---|---|
| $Zn(OH)_2$ | 90 | 97 |
| $Al(OH)_3$ | 92 | 98 |
| $Cd(OH)_2$ | 91 | 98 |
| $Cr(OH)_2$ | 92 | 98 |
| $Co(OH)_2$ | 92 | 98 |
| $Ni(OH)_2$ | 92 | 98 |
| $Mn(OH)_2$ | 91 | 97 |
| $Ca(OH)_2$ | 90 | 96 |
| $Mg(OH)_2$ | 91 | 97 |
| $Zr(OH)_4$ | 91 | 98 |
| FeOOH | 91 | 98 |
| NiOOH | 92 | 98 |

The batteries of Example 5 had both a high capacity maintenance rate and a high capacity recovery rate. This means that addition of the substance which produces water with an increase in temperature to the electrolyte exerts the same effects as those in the case of addition to the electrode.

Table 6 shows the results of evaluation when a variety of compounds having water of crystallization were used as the substance which produces water with an increase in temperature and added to the electrolyte. Addition of the compound having water of crystallization to the electrolyte resulted in both a high capacity maintenance rate and a high capacity recovery rate.

TABLE 6

| | Capacity maintenance rate (%) | Capacity recovery rate (%) |
|---|---|---|
| $Al_2O_3.3H_2O$ | 92 | 98 |
| $Ba(NO_3)_2.H_2O$ | 90 | 97 |
| $CaSO_4.2H_2O$ | 90 | 96 |
| $Co_3(PO_4)_2.8H_2O$ | 92 | 98 |
| $Sb_2O_5.2H_2O$ | 91 | 98 |
| $SnO.H_2O$ | 91 | 98 |
| $TiO_2.2H_2O$ | 91 | 98 |
| $Bi_2O_4.2H_2O$ | 91 | 97 |
| $WO_3.H_2O$ | 91 | 97 |

EXAMPLE 6

The content of the substance which produces water with an increase in temperature was studied in this example.

Figure 2:
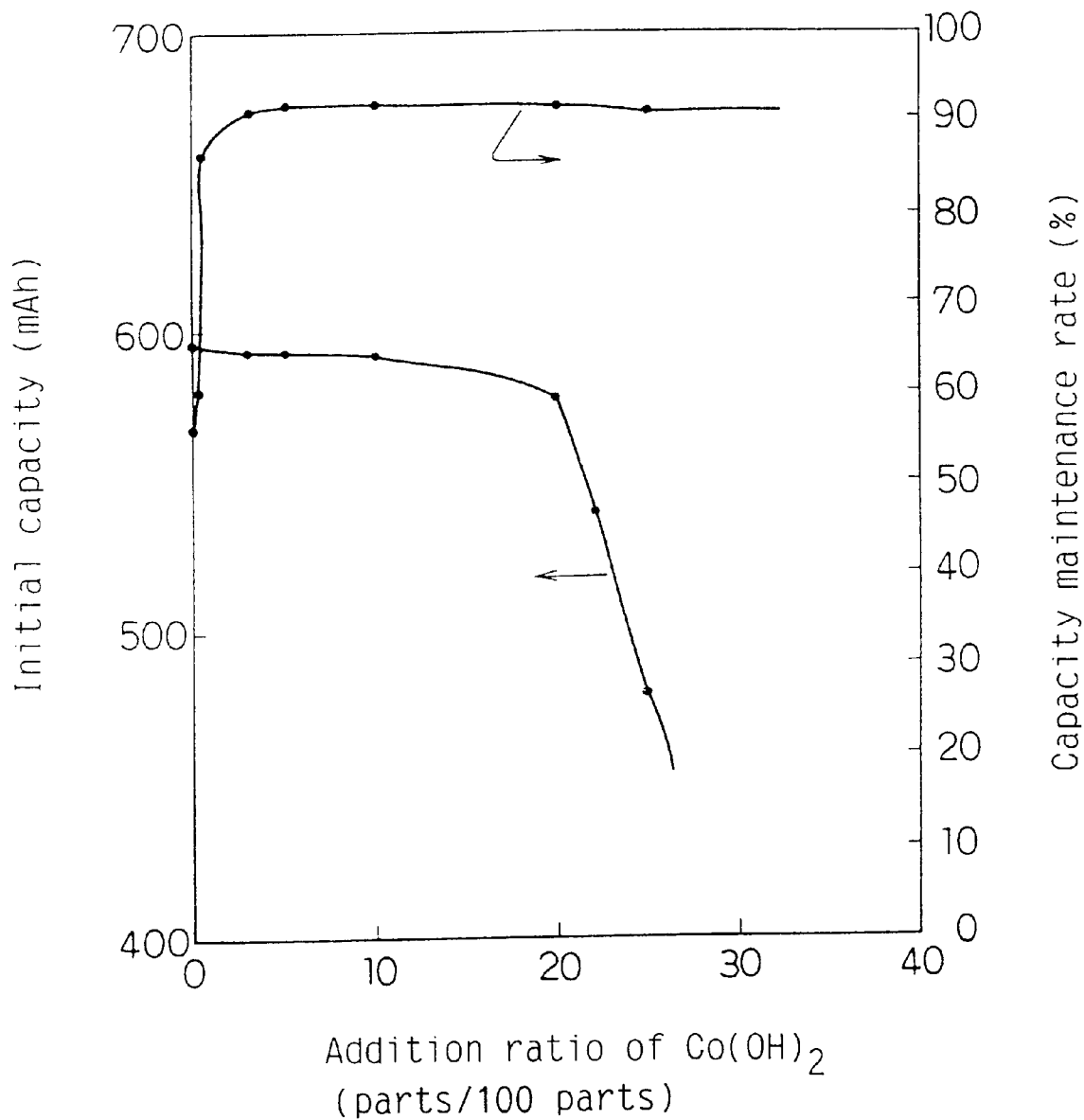
FIG. 2 is a graph showing the relationship between the addition ratio of cobalt hydroxide to the cathode and the initial capacity and the capacity maintenance rate of the battery.

The addition ratio of the substance which produces water with an increase in temperature to the cathode was examined first. Cobalt hydroxide was used as the substance which produces water with application of heat. While the content of cobalt hydroxide added to the active material of the cathode was varied, the batteries were assembled in the same manner as in Example 1. FIG. 2 is a graph showing the relationship between the addition ratio of cobalt hydroxide to the cathode and the initial capacity and the capacity maintenance rate of the battery.

When the content of the additive exceeded 20 parts by weight per 100 parts by weight of the active material, the initial capacity of the battery abruptly decreased. This is because the quantity of the active material included in the cathode decreases and the additive interferes with electric conduction between the active materials. The capacity maintenance rate after application of heat showed favorable values when the content of the additive was equal to or greater than 0.5 parts by weight per 100 parts by weight of the active material. These results show that the preferable content of the additive is 0.5 to 20 parts by weight per 100 parts by weight of the active material. Although cobalt hydroxide was used in this example, other hydroxides, boric acid, and compounds having water of crystallization had similar results.

Figure 3:
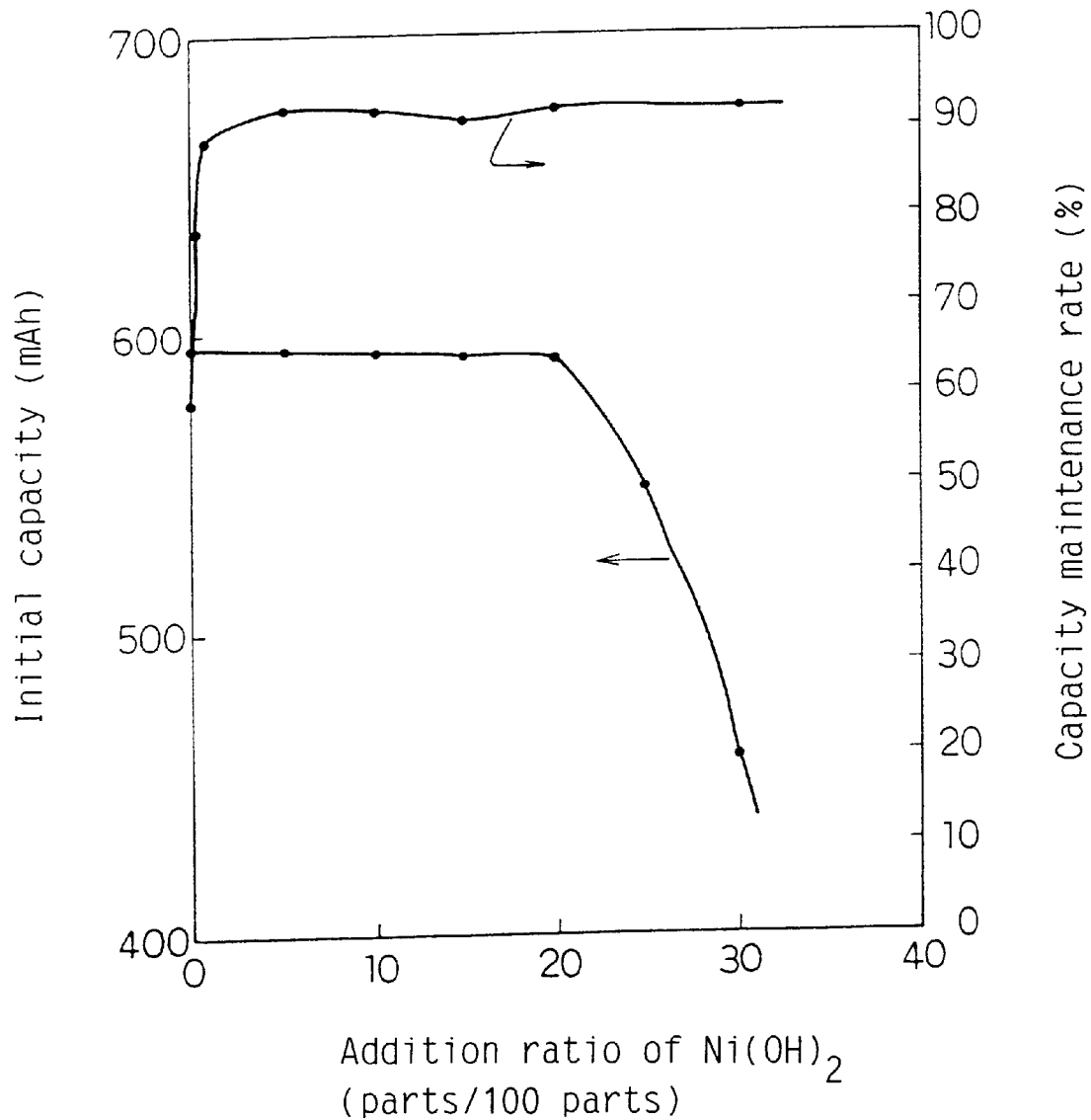
FIG. 3 is a graph showing the relationship between the addition ratio of nickel hydroxide to the anode and the initial capacity and the capacity maintenance rate of the battery.

The addition ratio of the substance which produces water with an increase in temperature to the anode was examined next. Nickel hydroxide was used as the substance which produces water with application of heat. While the content of nickel hydroxide added to the active material of the anode was varied, the batteries were assembled in the same manner as in Example 2. FIG. 3 is a graph showing the relationship between the addition ratio of nickel hydroxide to the anode and the initial capacity and the capacity maintenance rate of the battery.

When the content of the additive exceeded 20 parts by weight per 100 parts by weight of the active material, the initial capacity of the battery abruptly decreased. This is because the quantity of the active material included in the anode decreases and the additive interferes with electric conduction between the active materials. The capacity maintenance rate after application of heat showed favorable values when the content of the additive was equal to or greater than 0.5 parts by weight per 100 parts by weight of the active material. These results show that the preferable content of the additive is 0.5 to 20 parts by weight per 100 parts by weight of the active material. Although nickel hydroxide was used in this example, other hydroxides, boric acid, and compounds having water of crystallization had similar results.

Figure 4:
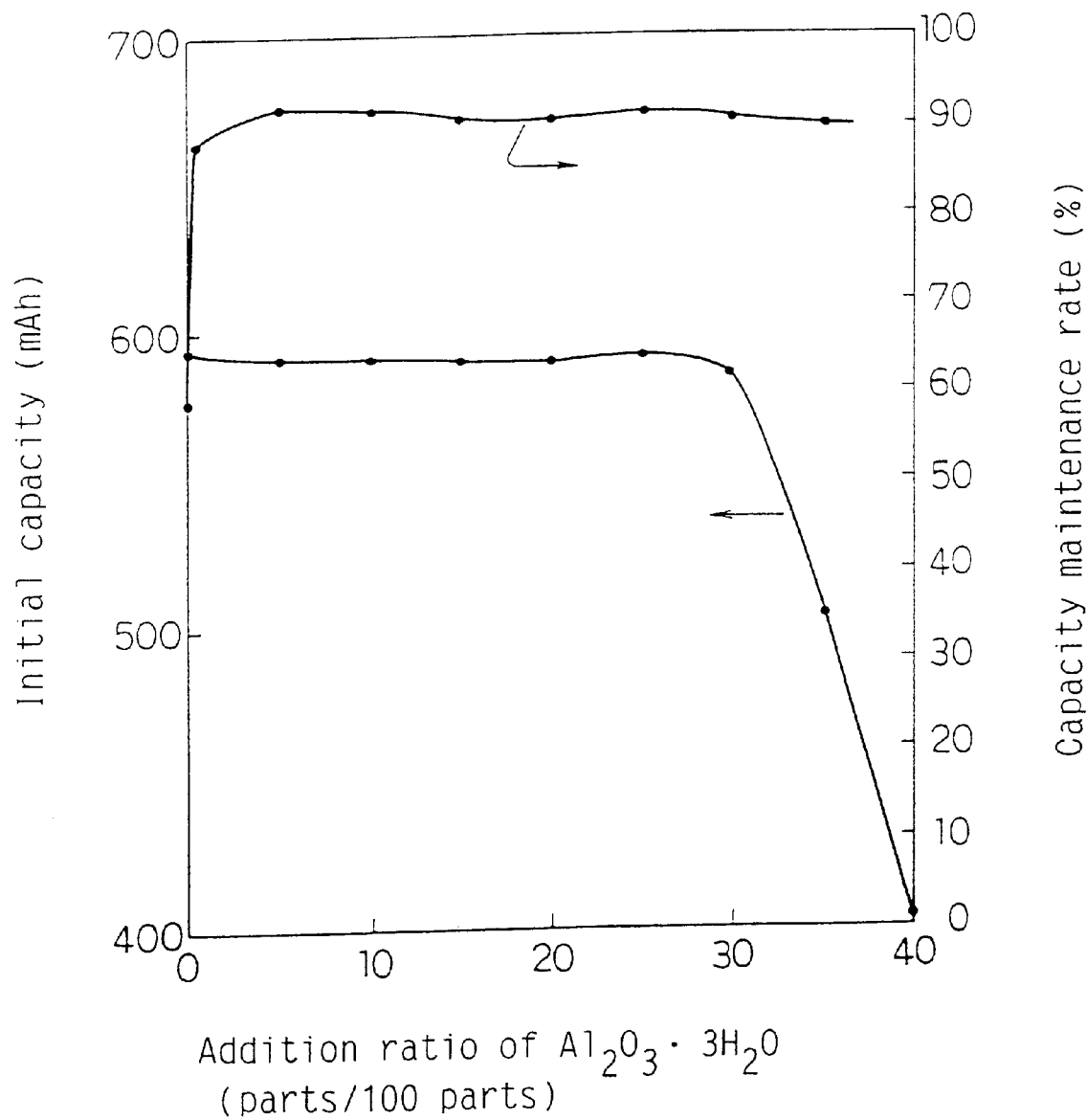
FIG. 4 is a graph showing the relationship between the addition ratio of hydrous aluminum oxide to the electrolyte and the initial capacity and the capacity maintenance rate of the battery.

The addition ratio of the substance which produces water with an increase in temperature to the electrolyte was examined. Hydrous aluminum oxide ($Al_2O_3.3H_2O$) was used as the substance which produces water with application of heat. While the content of hydrous aluminum oxide added to the electrolyte was varied, the batteries were assembled in the same manner as in Example 5. FIG. 4 is a graph showing the relationship between the addition ratio of hydrous aluminum oxide to the electrolyte and the initial capacity and the capacity maintenance rate of the battery.

When the content of hydrous aluminum oxide exceeded 30 parts by weight per 100 parts by weight of the electrolyte, the initial capacity of the battery abruptly decreased. This is because the additive lowers the ionic conductivity of the electrolyte and interferes with the reactions of the electrodes. The capacity maintenance rate after application of heat showed favorable values when the content of the additive was equal to or greater than 0.5 parts by weight per 100 parts by weight of the electrolyte. These results show that the preferable content of the additive is 0.5 to 30 parts by weight per 100 parts by weight of the electrolyte. Although hydrous aluminum oxide was used in this example, other hydroxides, boric acid, and compounds having water of crystallization had similar results.

EXAMPLE 7

In this example, the substance which produces water with an increase in temperature was included in a variety of sites in the battery other than the cathode, the anode, and the electrolyte.

The cathode, the anode, and the electrolyte used in Example 7 were the same as those of the comparative example discussed in Example 1. The batteries were assembled after addition of 0.5 g of nickel hydroxide to a central space of an electrode assembly prepared by spirally winding the cathode and the anode via the separator, between the electrode assembly and the battery case, and between the electrode assembly and the sealing plate. The battery of comparative example here was assembled without any additive. The batteries were evaluated in the same manner as in Example 1, and the results of evaluation are shown in Table 7.

TABLE 7

| Position of Ni(OH)$_2$ | Capacity maintenance rate (%) | Capacity recovery rate (%) |
|---|---|---|
| Central space of electrode assembly | 91 | 96 |
| Between electrode assembly and battery case | 91 | 97 |
| Above electrode assembly (Space below sealing plate) | 92 | 98 |

As clearly shown in Table 7, addition of the substance which produces water with an increase in temperature to the battery other than the electrodes and the electrolyte resulted in both a high capacity maintenance rate and a high capacity recovery rate. This means that the existence of the substance which produces water with an increase in temperature inside the battery effectively prevents deterioration of the properties of the battery when the battery is temporarily exposed to high temperatures. It is considered that water produced interferes with the reaction of the active material in the charged state with the electrolyte which causes deterioration of the cell performances.

In this example, nickel hydroxide was used as the compound which produces water with an increase in temperature. A variety of other compounds were also subjected to the same high-temperature durability test and had similar results. Examples of the other compounds included hydroxides, such as zinc hydroxide, aluminum hydroxide, cadmium hydroxide, chromium hydroxide, cobalt hydroxide, manganese hydroxide, calcium hydroxide, magnesium hydroxide, zirconium hydroxide, and iron hydroxide oxide, other OH-containing compounds, such as boric acid, and compounds having water of crystallization, such as hydrous aluminum oxide, hydrous barium nitrate, hydrous calcium sulfate, hydrous cobalt phosphate, hydrous antimony oxide, hydrous tin oxide, hydrous titanium oxide, hydrous bismuth oxide, and hydrous tungsten oxide.

The results of Examples 1 through 7 show that addition of the compound which produces water with an increase in temperature to the battery effectively prevents deterioration of the properties of the battery when the battery is temporarily exposed to high temperatures. This is because water thus produced interferes with the reaction of deteriorating the battery at high temperatures. Any compounds which eventually produce water with an increase in temperature other than the hydroxides and the compounds having water of crystallization specified above exert the same effects; for example, substances which release water adsorbed thereon and capsular and saccular structures containing water.

It is preferable that the substance produces water at temperatures of not lower than 60° C. The substance which produces water at relatively low temperatures of less than 60° C. undesirably produces water in the drying step of the electrode manufacturing process and does not produce any water in the actual state of temperature increase. The temperature of the drying step of the electrode manufacturing process may be lowered. The substance, however, still produces water in the normally applied temperature range and may adversely affect the properties of the battery.

EXAMPLE 8

In this example, a variety of carbonates and hydrogencarbonates were used as the substance which produces gaseous carbon dioxide with an increase in temperature and added to the cathode material mixture.

The batteries were assembled in the same manner as in Example 1, except that the compounds shown in Table 8 were used instead of the hydroxides.

The capacity maintenance rate and the capacity recovery rate after the high-temperature durability test of the respective batteries are shown in Table 8.

TABLE 8

|  | Capacity maintenance rate (%) | Capacity recovery rate (%) |
|---|---|---|
| $Na_2CO_3$ | 93 | 97 |
| $K_2CO_3$ | 92 | 97 |
| $Rb_2CO_3$ | 91 | 96 |
| $CaCO_3$ | 91 | 97 |
| $MgCO_3$ | 93 | 98 |
| $BaCO_3$ | 91 | 97 |
| $CoCO_3$ | 92 | 96 |
| $FeCO_3$ | 92 | 97 |
| $NiCO_3$ | 93 | 97 |
| $ZnCO_3$ | 92 | 96 |
| $NaHCO_3$ | 92 | 96 |
| $KHCO_3$ | 91 | 96 |
| $RbHCO_3$ | 91 | 95 |
| $CsHCO_3$ | 91 | 95 |

The batteries of Example 8 with one of the carbonates and hydrogencarbonates being added to the cathode had both a high capacity maintenance rate and a high capacity recovery rate. This elucidates that addition of the carbonates and hydrogencarbonates to the cathode material mixture effectively prevents a decrease in capacity due to exposure of the battery to high temperatures. It is considered that these compounds interfere with the reaction of the active material in the charged state with the electrolyte which causes deterioration of the cell performances.

EXAMPLE 9

In this example, a variety of carbonates and hydrogencarbonates were used as the substance which produces gaseous carbon dioxide with an increase in temperature and added to the anode material mixture.

The batteries were assembled in the same manner as in Example 2, except that the compounds shown in Table 9 were used instead of the hydroxides.

The capacity maintenance rate and the capacity recovery rate after the high-temperature durability test of the respective batteries are shown in Table 9.

TABLE 9

|  | Capacity maintenance rate (%) | Capacity recovery rate (%) |
|---|---|---|
| $Na_2CO_3$ | 93 | 96 |
| $K_2CO_3$ | 92 | 96 |
| $Rb_2CO_3$ | 92 | 96 |
| $CaCO_3$ | 92 | 96 |
| $MgCO_3$ | 92 | 97 |
| $BaCO_3$ | 92 | 96 |
| $CoCO_3$ | 92 | 97 |
| $FeCO_3$ | 92 | 96 |
| $NiCO_3$ | 93 | 97 |

TABLE 9-continued

| | Capacity maintenance rate (%) | Capacity recovery rate (%) |
|---|---|---|
| ZnCO$_3$ | 91 | 95 |
| Li$_2$CO$_3$ | 90 | 95 |
| NaHCO$_3$ | 92 | 97 |
| KHCO$_3$ | 92 | 97 |
| RbHCO$_3$ | 91 | 95 |
| CsHCO$_3$ | 91 | 96 |

Like the batteries of Example 8, the batteries of Example 9 with one of the carbonates and hydrogencarbonates being added to the anode had both a high capacity maintenance rate and a high capacity recovery rate.

EXAMPLE 10

In this example, a variety of carbonates and hydrogencarbonates except lithium carbonate were used as the substance which produces gaseous carbon dioxide with an increase in temperature and added to an anode of metallic lithium.

The metallic lithium anode was prepared by cutting a lithium foil of 600 μm in thickness and attaching lead terminals to the lithium foil. Each one of the carbonates and hydrogencarbonates shown in Table 10 was dispersed in a petroleum solvent. The dispersion was sprayed onto the surface of the anode, and the solvent was evaporated and dried. The weight of the carbonate or the hydrogencarbonate adhering to the anode was calculated from the difference in weight before and after the spraying and drying process. The content of the carbonate or the hydrogencarbonate was regulated to be approximately 10 parts by weight per 100 parts by weight of metallic lithium.

The batteries were assembled in the same manner as in Example 2 except the difference in anode.

The respective batteries were evaluated in the same manner as in Example 1, except that the battery was heated at 100° C. after completion of charging in the eleventh cycle. The capacity maintenance rate and the capacity recovery rate after the high-temperature durability test of the respective batteries are shown in Table 10.

TABLE 10

| | Capacity maintenance rate (%) | Capacity recovery rate (%) |
|---|---|---|
| Na$_2$CO$_3$ | 90 | 95 |
| K$_2$CO$_3$ | 90 | 94 |
| Rb$_2$CO$_3$ | 89 | 94 |
| CaCO$_3$ | 90 | 94 |
| MgCO$_3$ | 91 | 96 |
| BaCO$_3$ | 90 | 95 |
| CoCO$_3$ | 91 | 93 |
| FeCO$_3$ | 89 | 92 |
| NiCO$_3$ | 90 | 93 |
| ZnCO$_3$ | 91 | 92 |
| NaHCO$_3$ | 89 | 90 |
| KHCO$_3$ | 88 | 91 |
| RbHCO$_3$ | 89 | 93 |
| CsHCO$_3$ | 87 | 90 |

The batteries of Example 10 had both a high capacity maintenance rate and a high capacity recovery rate. This elucidates that addition of the carbonates and hydrogencarbonates to the anode of metallic lithium effectively prevents a decrease in capacity due to exposure of the battery to high temperatures.

EXAMPLE 11

In this example, a variety of carbonates and hydrogencarbonates were used as the substance which produces gaseous carbon dioxide with an increase in temperature and added to the non-aqueous electrolyte.

The batteries were assembled in the same manner in Example 5, except that the compounds shown in Table 11 were used here, and evaluated in the same manner as in Example 1.

The capacity maintenance rate and the capacity recovery rate after the high-temperature durability test the respective batteries are shown in Table 11. The batteries of Example 11 had both a high capacity maintenance rate and a high capacity recovery rate.

TABLE 11

| | Capacity maintenance rate (%) | Capacity recovery rate (%) |
|---|---|---|
| Na$_2$CO$_3$ | 93 | 96 |
| K$_2$CO$_3$ | 93 | 95 |
| Rb$_2$CO$_3$ | 93 | 95 |
| CaCO$_3$ | 94 | 96 |
| MgCO$_3$ | 95 | 97 |
| BaCO$_3$ | 93 | 95 |
| CoCO$_3$ | 92 | 96 |
| FeCO$_3$ | 93 | 95 |
| NiCO$_3$ | 95 | 97 |
| ZnCO$_3$ | 93 | 95 |
| Li$_2$CO$_3$ | 91 | 92 |
| NaHCO$_3$ | 93 | 95 |
| KHCO$_3$ | 94 | 97 |
| RbHCO$_3$ | 93 | 94 |
| CsHCO$_3$ | 92 | 93 |

EXAMPLE 12

In this example, a variety of carbonates and hydrogencarbonates were used as the substance which produces gaseous carbon dioxide with an increase in temperature and added to a separator.

Each one of the compounds shown in Table 12 was dispersed in dimethoxyethane. The dispersion was applied on a separator of a microporous polypropylene film and dried, so that each compound adheres on the surface of the separator.

The batteries were assembled in the same manner as in the comparative example discussed in Example 1, except that the separator was used in this example.

The capacity maintenance rate and the capacity recovery rate after the high-temperature durability test of the respective batteries are shown in Table 12. The batteries of Example 12 had both a high capacity maintenance rate and a high capacity recovery rate. Addition of the compound which produces gaseous carbon dioxide with an increase in temperature to the separator exerts the same effects as those in the case of addition to the electrodes.

TABLE 12

| | Capacity maintenance rate (%) | Capacity recovery rate (%) |
|---|---|---|
| Na$_2$CO$_3$ | 92 | 94 |
| K$_2$CO$_3$ | 92 | 95 |
| Rb$_2$CO$_3$ | 91 | 93 |
| CaCO$_3$ | 92 | 94 |
| MgCO$_3$ | 93 | 95 |

TABLE 12-continued

| | Capacity maintenance rate (%) | Capacity recovery rate (%) |
|---|---|---|
| $BaCO_3$ | 92 | 94 |
| $CoCO_3$ | 92 | 94 |
| $FeCO_3$ | 91 | 94 |
| $NiCO_3$ | 92 | 95 |
| $ZnCO_3$ | 90 | 94 |
| $Li_2CO_3$ | 89 | 92 |
| $NaHCO_3$ | 91 | 95 |
| $KHCO_3$ | 92 | 96 |
| $RbHCO_3$ | 90 | 94 |
| $CsHCO_3$ | 89 | 94 |

EXAMPLE 13

The content of the substance which produces gaseous carbon dioxide with an increase in temperature was studied in this example.

Figure 5:
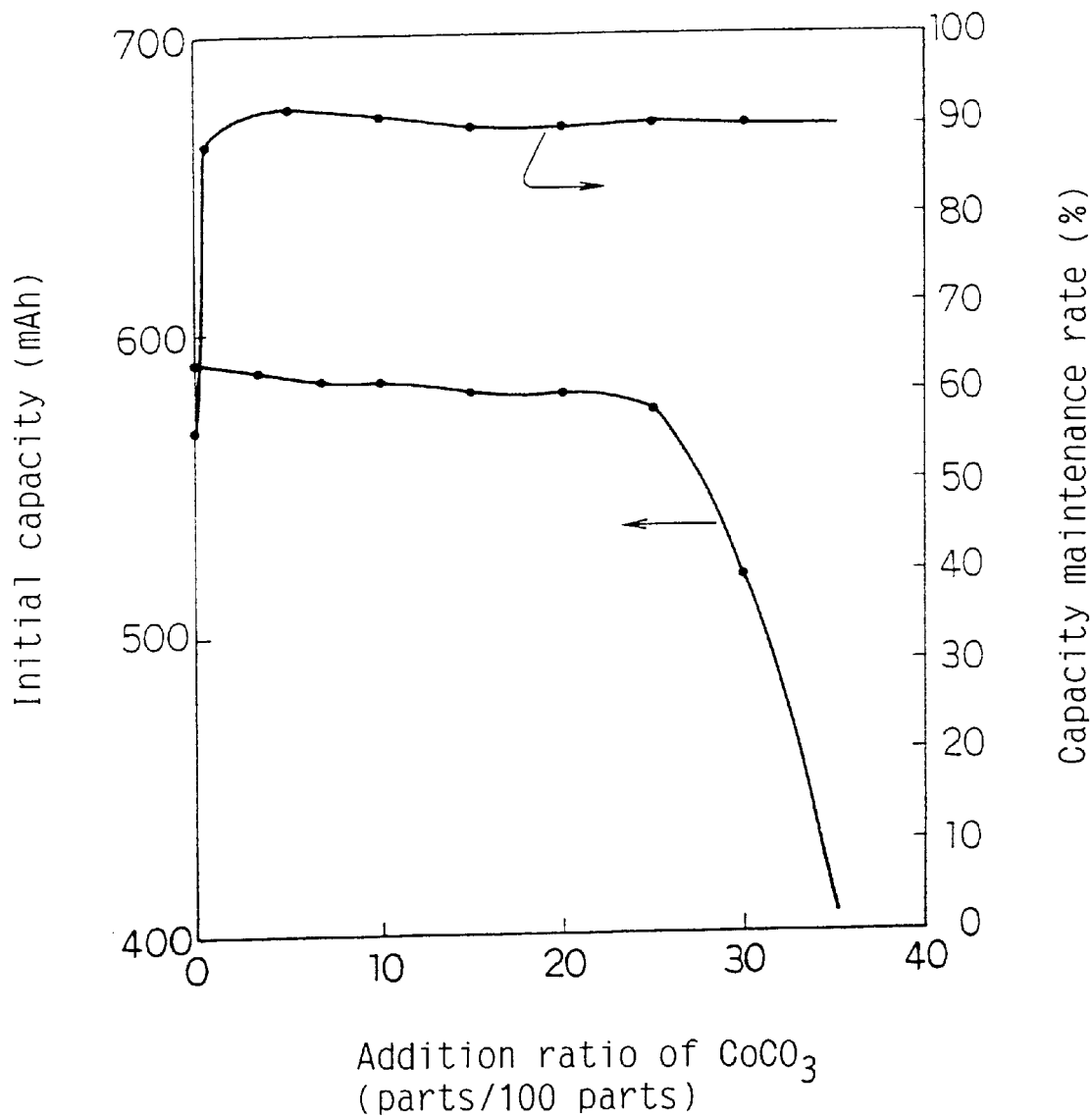
FIG. 5 is a graph showing the relationship between the addition ratio of cobalt carbonate to the cathode and the initial capacity and the capacity maintenance rate of the battery.

The addition ratio of the substance which produces gaseous carbon dioxide with an increase in temperature to the cathode was examined first. Cobalt carbonate was used as the substance which produces gaseous carbon dioxide with application of heat. While the content of cobalt carbonate added to the active material of the cathode was varied, the batteries were assembled in the same manner as in Example 1. FIG. 5 is a graph showing the relationship between the addition ratio of cobalt carbonate to the cathode and the initial capacity and the capacity maintenance rate of the battery.

When the content of the additive exceeded 25 parts by weight per 100 parts by weight of the active material, the initial capacity of the battery abruptly decreased. This is because the quantity of the active material included in the cathode decreases and the additive interferes with electric conduction between the active materials. The capacity maintenance rate after application of heat showed favorable values when the content of the additive was equal to or greater than 0.5 parts by weight per 100 parts by weight of the active material. These results show that the preferable content of the additive is 0.5 to 25 parts by weight per 100 parts by weight of the active material. Although cobalt carbonate was used in this example, other carbonates and hydrogencarbonates used in Example 8 had similar results.

Figure 6:
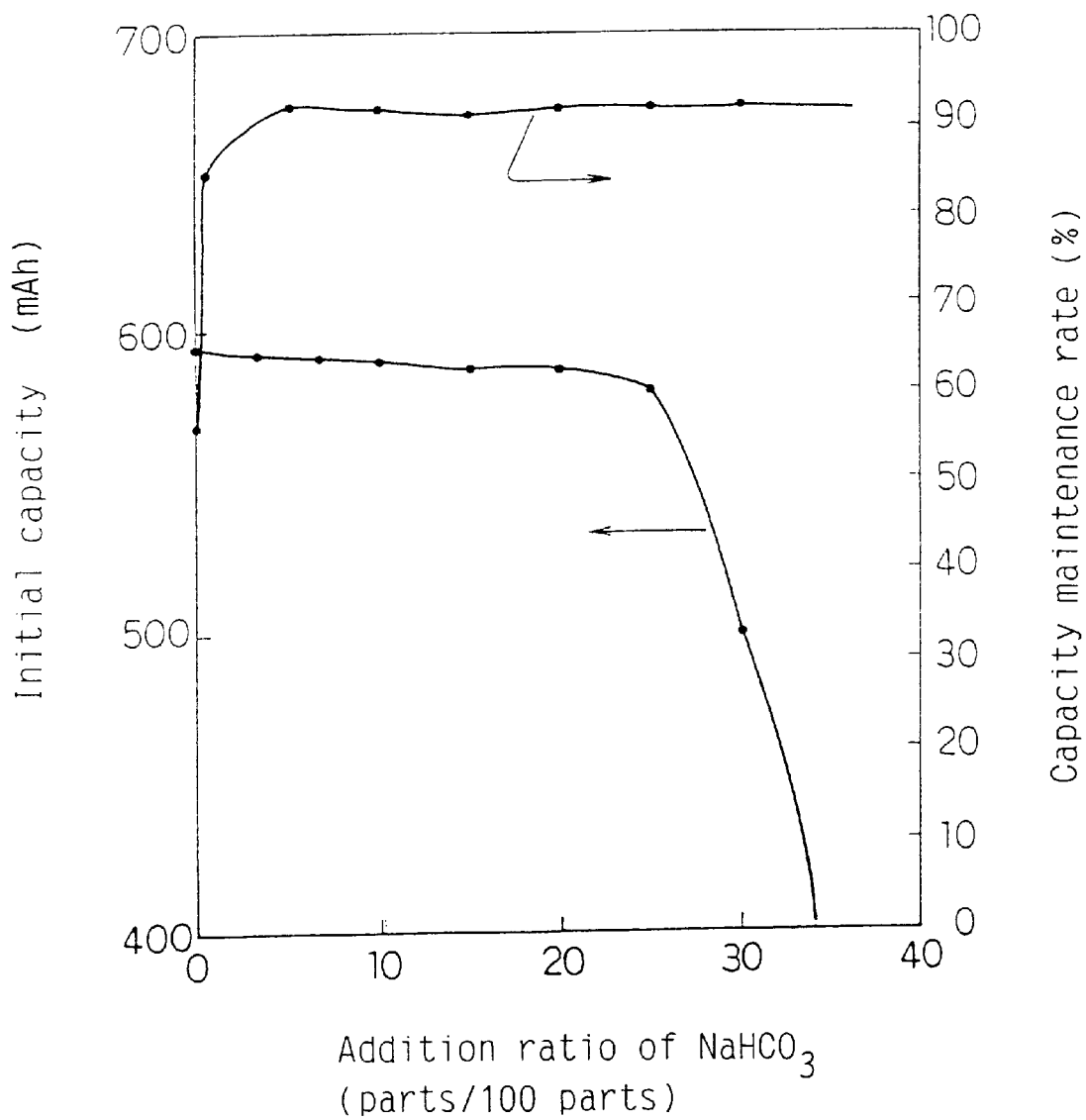
FIG. 6 is a graph showing the relationship between the addition ratio of sodium hydrogencarbonate to the anode and the initial capacity and the capacity maintenance rate of the battery.

The addition ratio of the substance which produces gaseous carbon dioxide with an increase in temperature to the anode was examined next. Sodium hydrogencarbonate was used as the substance which produces gaseous carbon dioxide with application of heat. While the content of sodium hydrogencarbonate added to the active material of the anode was varied, the batteries were assembled in the same manner as in Example 2. FIG. 6 is a graph showing the relationship between the addition ratio of sodium hydrogencarbonate to the anode and the initial capacity and the capacity maintenance rate of the battery.

When the content of the additive exceeded 25 parts by weight per 100 parts by weight of the active material, the initial capacity of the battery abruptly decreased. This is because the quantity of the active material included in the anode decreases and the additive interferes with electric conduction between the active materials. The capacity maintenance rate after application of heat showed favorable values when the content of the additive was equal to or greater than 0.5 parts by weight per 100 parts by weight of the active material. These results show that the preferable content of the additive is 0.5 to 25 parts by weight per 100 parts by weight of the active material. Although sodium hydrogencarbonate was used in this example, other carbonates and hydrogencarbonates used in Example 9 had similar results.

Figure 7:
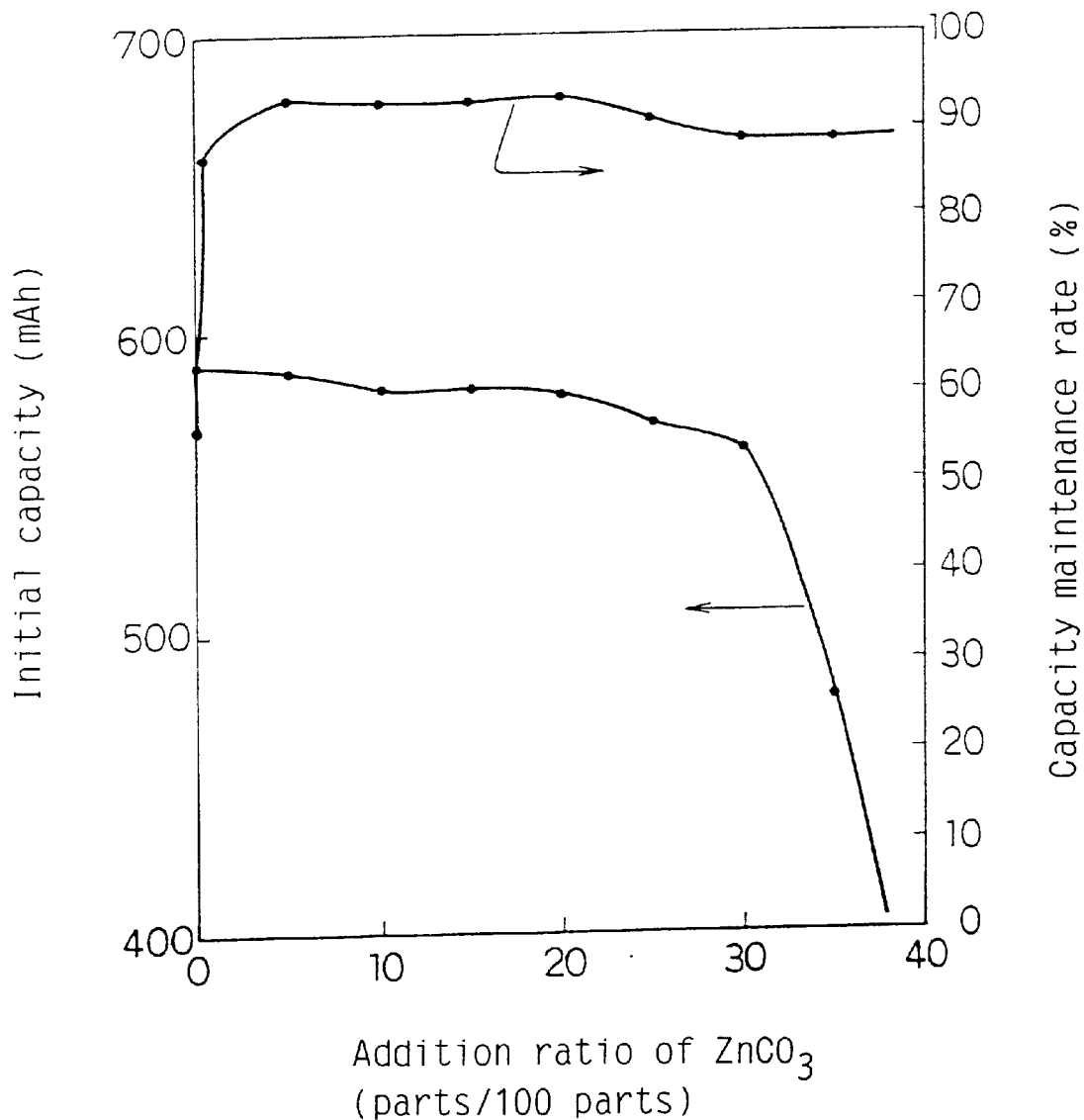
FIG. 7 is a graph showing the relationship between the addition ratio of zinc carbonate to the electrolyte and the initial capacity and the capacity maintenance rate of the battery.

The addition ratio of the substance which produces gaseous carbon dioxide with an increase in temperature to the electrolyte was examined. Zinc carbonate was used as the substance which produces gaseous carbon dioxide with application of heat. While the content of zinc carbonate added to the electrolyte was varied, the batteries were assembled in the same manner as in Example 5. FIG. 7 is a graph showing the relationship between the addition ratio of zinc carbonate to the electrolyte and the initial capacity and the capacity maintenance rate of the battery.

When the content of zinc carbonate exceeded 30 parts by weight per 100 parts by weight of the electrolyte, the initial capacity of the battery abruptly decreased. This is because the additive lowers the ion conductivity of the electrolyte and interferes with the reactions of the electrodes. The capacity maintenance rate after application of heat showed favorable values when the content of the additive was equal to or greater than 0.5 parts by weight per 100 parts by weight of the electrolyte. These results show that the preferable content of the additive is 0.5 to 30 parts by weight per 100 parts by weight of the electrolyte. Although zinc carbonate was used in this example, other carbonates and hydrogencarbonates used in Example 11 had similar results.

EXAMPLE 14

In this example, the substance which produces gaseous carbon dioxide with an increase in temperature was included in a variety of sites in the battery other than the cathode, the anode, and the electrolyte.

The cathode, the anode, and the electrolyte used in Example 14 were the same as those of the comparative example discussed in Example 1. The batteries were assembled after addition of 0.5 g of barium carbonate to a central space of an electrode assembly prepared by spirally winding the cathode and the anode via the separator, between the electrode assembly and the battery case, and between the electrode assembly and the sealing plate. The batteries were evaluated in the same manner as in Example 1, and the results of evaluation are shown in Table 13.

TABLE 13

| Position of $BaCO_3$ | Capacity maintenance rate (%) | Capacity recovery rate (%) |
|---|---|---|
| Central space of electrode assembly | 89 | 93 |
| Between electrode assembly and battery case | 91 | 94 |
| Above electrode assembly (Space below sealing plate) | 85 | 89 |

As clearly shown in Table 13, addition of the substance which produces gaseous carbon dioxide with an increase in temperature to the battery other than the electrodes and the electrolyte resulted in both a high capacity maintenance rate and a high capacity recovery rate. This means that the existence of the substance which produces gaseous carbon dioxide with an increase in temperature inside the battery effectively prevents deterioration of the properties of the battery when the battery is temporarily exposed to high temperatures.

Although barium carbonate was used as the substance which produces gaseous carbon dioxide with an increase in temperature in this example, the compounds specified above which produce gaseous carbon dioxide with an increase in temperature exert the same effects.

EXAMPLE 15

In Examples 8 and 9, the substance which produces gaseous carbon dioxide with an increase in temperature was added to the cathode material mixture and the anode material mixture, respectively. In this example, however, the substance which produces gaseous carbon dioxide with an increase in temperature was applied on the surface of the cathode or the anode.

The cathode plate and the anode plate were prepared in the same manner as in the comparative example discussed in Example 1. A compound which produces gaseous carbon dioxide with an increase in temperature was mixed with water or a petroleum solvent. The compound may be dissolved in water or the petroleum solvent used as the medium or suspended in the medium. The solution or the suspension was applied on the surface of the electrode, and the medium was evaporated and dried.

Another procedure may be adopted to apply the compound on the surface of the electrode. The compound which produces gaseous carbon dioxide was mixed with the petroleum solvent, which was identical with that used for preparation of the paste of the electrode material mixture. The paste of the electrode material mixture was applied on a core member. The mixed solution was sprayed onto the surface on which the paste was applied, before the paste was dried. The core member with the paste of the electrode material mixture and the mixed solution was then dried at 95° C. and rolled. This procedure ensures secure adhesion of the compound to the electrode material mixture and effectively prevents the additive from peeling off in the process of manufacturing the battery.

The batteries were assembled in the same manner as in the comparative example except the difference in cathode and evaluated in the same manner as in Example 1. The results of evaluation are shown in Table 14. The batteries were also assembled in the same manner as in the comparative example except the difference in anode and evaluated in the same manner as in Example 1. The results of evaluation are shown in Table 15. As clearly understood from Tables 14 and 15, application of the compound which produces gaseous carbon dioxide on the surface of the electrode exerts the same effects as those in the case of addition of the compound to the electrode material mixture.

TABLE 14

|  | Capacity maintenance rate (%) | Capacity recovery rate (%) |
|---|---|---|
| $Na_2CO_3$ | 93 | 96 |
| $K_2CO_3$ | 92 | 96 |
| $Rb_2CO_3$ | 92 | 95 |
| $CaCO_3$ | 92 | 97 |
| $MgCO_3$ | 93 | 97 |
| $BaCO_3$ | 91 | 95 |
| $CoCO_3$ | 91 | 96 |
| $FeCO_3$ | 92 | 96 |
| $NiCO_3$ | 92 | 97 |
| $ZnCO_3$ | 91 | 95 |
| $NaHCO_3$ | 92 | 96 |
| $KHCO_3$ | 92 | 95 |
| $RbHCO_3$ | 91 | 94 |
| $CsHCO_3$ | 90 | 93 |

TABLE 15

|  | Capacity maintenance rate (%) | Capacity recovery rate (%) |
|---|---|---|
| $Na_2CO_3$ | 92 | 95 |
| $K_2CO_3$ | 92 | 96 |
| $Rb_2CO_3$ | 93 | 96 |
| $CaCO_3$ | 93 | 95 |
| $MgCO_3$ | 92 | 95 |
| $BaCO_3$ | 91 | 95 |
| $CoCO_3$ | 92 | 96 |
| $FeCO_3$ | 91 | 95 |
| $NiCO_3$ | 93 | 97 |
| $ZnCO_3$ | 92 | 96 |
| $Li_2CO_3$ | 89 | 93 |
| $NaHCO_3$ | 93 | 96 |
| $KHCO_3$ | 92 | 95 |
| $RbHCO_3$ | 92 | 96 |
| $CsHCO_3$ | 90 | 94 |

EXAMPLE 16

In this example, a variety of aluminum compounds, nickel compounds, and cobalt compounds were added to the cathode material mixture.

The batteries were assembled in the same manner as in Example 1, except that 7 g of each compound shown in Table 16 was used instead of 5 g of the hydroxide, and evaluated under the same conditions as those of Example 1. The capacity maintenance rate and the capacity recovery rate after the high-temperature durability test of the respective batteries are shown in Table 16.

TABLE 16

|  | Capacity maintenance rate(%) | Capacity recovery rate(%) |
|---|---|---|
| Aluminum compounds |  |  |
| $Al_2O_3$ | 91 | 98 |
| $Al_2(SO_4)_3$ | 91 | 97 |
| $AlPO_4$ | 90 | 97 |
| $AlCl_3$ | 90 | 96 |
| Nickel Compounds |  |  |
| NiO | 92 | 97 |
| $NiSO_4$ | 93 | 98 |
| $Ni_3(PO_4)_2$ | 92 | 97 |
| $NiCO_3$ | 91 | 97 |
| Cobalt compounds |  |  |
| $Co_2O_3$ | 92 | 98 |
| $CoSO_4$ | 91 | 98 |
| $Co_3(PO_4)_2$ | 90 | 97 |
| $CoCO_3$ | 90 | 97 |
| $Co(C_2O_4)$ | 91 | 96 |

The batteries of Example 16 had both a high capacity maintenance rate and a high capacity recovery rate. This elucidates that addition of the aluminum compounds, nickel compounds, and cobalt compounds to the cathode material mixture effectively prevents a decrease in capacity due to exposure of the battery to high temperatures. It is considered that the existence of aluminum, nickel, or cobalt interferes with the reaction of the active material in the charged state with the electrolyte at high temperatures which causes deterioration of the cell performances.

EXAMPLE 17

In this example, a variety of aluminum compounds, nickel compounds, and cobalt compounds were added to the anode material mixture.

The batteries were assembled in the same manner as in Example 2, except that each compound shown in Table 17 was used instead of the hydroxide, and evaluated under the same conditions as those of Example 1. The capacity maintenance rate and the capacity recovery rate after the high-temperature durability test of the respective batteries are shown in Table 17.

TABLE 17

|  | Capacity maintenance rate(%) | Capacity recovery rate(%) |
| --- | --- | --- |
| Aluminum compounds |  |  |
| $Al_2O_3$ | 92 | 98 |
| $Al_2(SO_4)_3$ | 92 | 97 |
| $AlPO_4$ | 90 | 97 |
| $AlCl_3$ | 91 | 96 |
| Nickel Compounds |  |  |
| NiO | 92 | 97 |
| $NiSO_4$ | 93 | 98 |
| $Ni_3(PO_4)_2$ | 91 | 96 |
| $NiCO_3$ | 91 | 96 |
| Cobalt compounds |  |  |
| $Co_2O_3$ | 94 | 98 |
| $CoSO_4$ | 92 | 98 |
| $Co_3(PO_4)_2$ | 91 | 97 |
| $CoCO_3$ | 90 | 97 |
| $Co(C_2O_4)$ | 90 | 97 |

The results show that addition of the aluminum compounds, nickel compounds, and cobalt compounds to the anode material mixture effectively prevents a decrease in capacity due to exposure of the battery to high temperatures.

EXAMPLE 18

In this example, a variety of aluminum compounds, nickel compounds, and cobalt compounds were added to the electrolyte.

The electrolyte used in this example was prepared by dissolving 1 mol/l lithium perchlorate in a mixed solution of ethylene carbonate and dimethoxyethane in an equivolumetric ratio. Each compound shown in Table 18 was added to the electrolyte at the ratio of 2 parts by weight per 100 parts by weight of the electrolyte. It is not necessary to dissolve the additive in the electrolyte.

The batteries including the cathode and the anode of the comparative example were assembled and evaluated in the same manner as in Example 1. The capacity maintenance rate and the capacity recovery rate after the high-temperature durability test of the respective batteries are shown in Table 18.

TABLE 18

|  | Capacity maintenance rate(%) | Capacity recovery rate(%) |
| --- | --- | --- |
| Aluminum compounds |  |  |
| $Al_2O_3$ | 92 | 98 |
| $Al_2(SO_4)_3$ | 92 | 97 |
| $AlPO_4$ | 91 | 97 |
| $AlCl_3$ | 91 | 97 |
| $Al(CH_3COO)_3$ | 92 | 98 |
| $Al_2(C_2O_4)_3 \cdot nH_2O$ | 91 | 97 |
| Nickel Compounds |  |  |
| NiO | 92 | 97 |

TABLE 18-continued

|  | Capacity maintenance rate(%) | Capacity recovery rate(%) |
| --- | --- | --- |
| $NiSO_4$ | 93 | 97 |
| $Ni_3(PO_4)_2$ | 91 | 96 |
| $NiCO_3$ | 91 | 96 |
| $Ni(ClO_4)_2$ | 93 | 98 |
| $Ni(NO_3)_2$ | 92 | 97 |
| $Ni(CH_3COO)_2$ | 92 | 98 |
| Cobalt compounds |  |  |
| $Co_2O_3$ | 92 | 98 |
| $CoSO_4$ | 91 | 98 |
| $Co_3(PO_4)_2$ | 90 | 97 |
| $CoCO_3$ | 90 | 96 |
| $Co(C_2O_4)$ | 92 | 98 |
| $Co(CH_3COO)_3$ | 91 | 97 |
| $Co(ClO_4)_2$ | 93 | 98 |

The results show that addition of the aluminum compounds, nickel compounds, and cobalt compounds to the electrolyte effectively prevents a decrease in capacity due to exposure of the battery to high temperatures.

EXAMPLE 19

The addition ratio of the aluminum compound, nickel compound, or cobalt compound was studied in this example.

Figure 8:
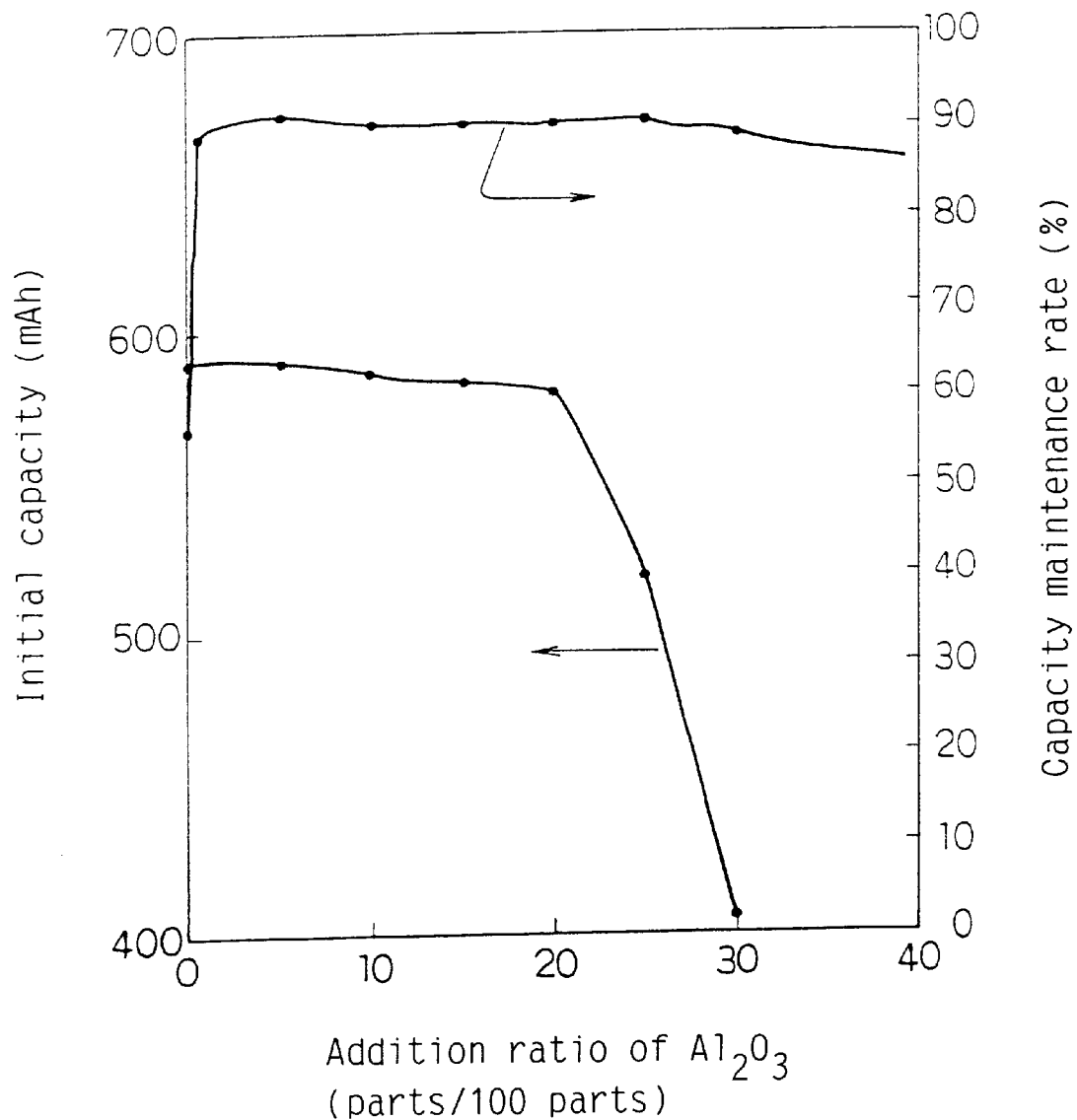
FIG. 8 is a graph showing the relationship between the addition ratio of aluminum oxide to the cathode and the initial capacity and the capacity maintenance rate of the battery.

The addition ratio of the compound to the cathode was examined first. Aluminum oxide was added to the cathode. While the content of aluminum oxide added to the active material of the cathode was varied, the batteries were assembled in the same manner as in Example 16. FIG. 8 is a graph showing the relationship between the addition ratio of aluminum oxide to the cathode and the initial capacity and the capacity maintenance rate of the battery.

When the content of aluminum oxide exceeded 20 parts by weight per 100 parts by weight of the active material, the initial capacity of the battery abruptly decreased. This is because the quantity of the active material included in the cathode decreases and the additive interferes with electric conduction between the active materials. The capacity maintenance rate after application of heat showed favorable values when the content of the additive was equal to or greater than 0.5 parts by weight per 100 parts by weight of the active material. These results show that the preferable content of the additive is 0.5 to 20 parts by weight per 100 parts by weight of the active material. Although aluminum oxide was used in this example, other compounds used in Example 16 had similar results.

Figure 9:
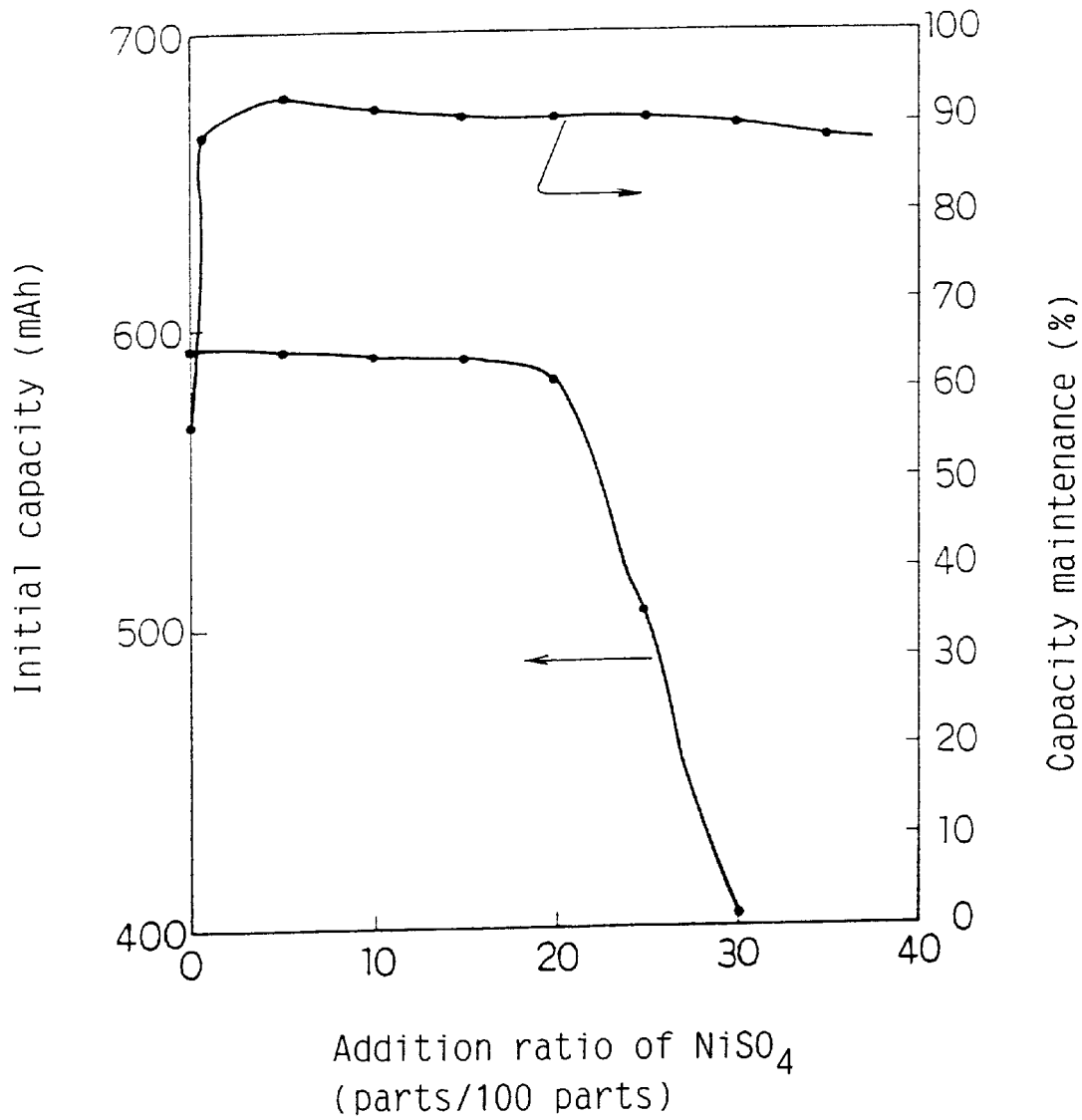
FIG. 9 is a graph showing the relationship between the addition ratio of nickel sulfate to the anode and the initial capacity and the capacity maintenance rate of the battery.

The addition ratio of the compound to the anode was examined next. Nickel sulfate was added to the anode. While the content of nickel sulfate added to the active material of the anode was varied, the batteries were assembled in the same manner as in Example 17. FIG. 9 is a graph showing the relationship between the addition ratio of nickel sulfate to the anode and the initial capacity and the capacity maintenance rate of the battery.

When the content of nickel sulfate exceeded 20 parts by weight per 100 parts by weight of the active material, the initial capacity of the battery abruptly decreased. This is because the quantity of the active material included in the anode decreases and the additive interferes with electric conduction between the active materials. The capacity maintenance rate after application of heat showed favorable values when the content of the additive was equal to or greater than 0.5 parts by weight per 100 parts by weight of the active material. These results show that the preferable content of the additive is 0.5 to 20 parts by weight per 100 parts by weight of the active material. Although nickel sulfate was used in this example, other compounds used in Example 17 had similar results.

Figure 10:
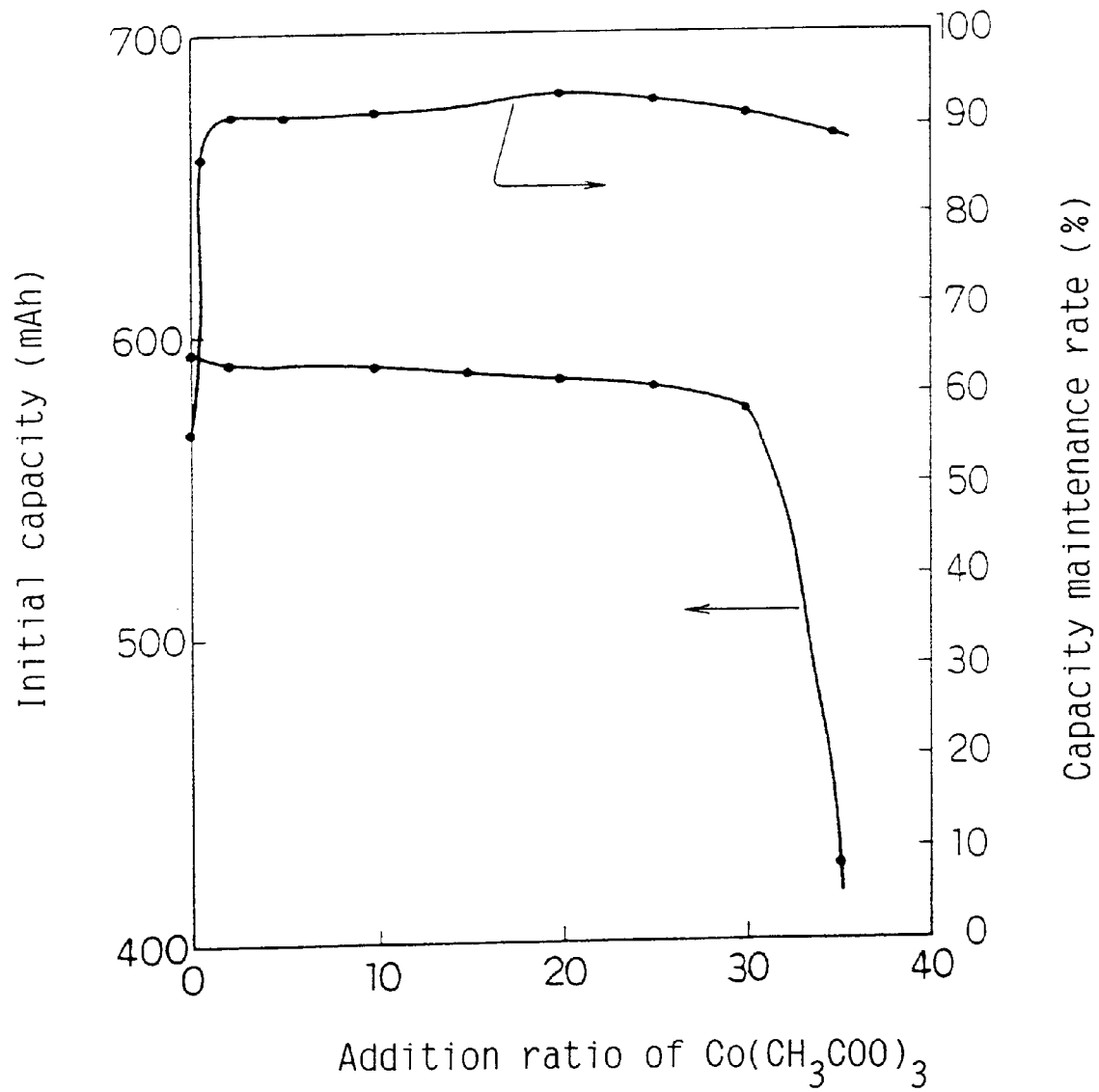
FIG. 10 is a graph showing the relationship between the addition ratio of cobalt acetate to the electrolyte and the initial capacity and the capacity maintenance rate of the battery.

The addition ratio of the compound to the electrolyte was examined. Cobalt acetate was added to the electrolyte. While the content of cobalt acetate added to the electrolyte was varied, the batteries were assembled in the same manner as in Example 18. FIG. 10 is a graph showing the relationship between the addition ratio of cobalt acetate to the electrolyte and the initial capacity and the capacity maintenance rate of the battery.

When the content of cobalt acetate exceeded 30 parts by weight per 100 parts by weight of the electrolyte, the initial capacity of the battery abruptly decreased. The capacity maintenance rate after application of heat showed favorable values when the content of the additive was equal to or greater than 0.5 parts by weight per 100 parts by weight of the electrolyte. These results show that the preferable content of the additive is 0.5 to 30 parts by weight per 100 parts by weight of the electrolyte. Although cobalt acetate was used in this example, other compounds used in Example 18 had similar results.

In the above examples, specific materials were applied for the cathode active material, the anode active material, and the electrolyte. The principle of the present invention is, however, not restricted to these materials, but may be applicable to other materials that are generally used for the non-aqueous electrolyte secondary batteries. Available examples of the anode active material include graphite-analogous compounds, aluminum, and aluminum alloys. Available examples of the cathode active material include those absorbing and desorbing lithium or another similar element, such as $LiCoO_2$, $LiMn_2O_4$, $LiMnO_2$, $LiFeO_2$, $MnO_2$, and $V_2O_5$. Available examples of the solvent for the electrolyte include organic solvents, such as ethylene carbonate, diethyl carbonate, methyl ethyl carbonate, dimethoxyethane, tetrahydrofuran, methyl tetrahydrofuran, γ-butyrolactone, dioxolane, and dimethyl sulfoxide. Available examples of the solute include lithium salts, such as lithium hexafluorophosphate, lithium tetrafluoroborate, and lithium trifluoromethane sulfonate. The configuration of the battery is also not restricted to the cylindrical shape, but the batteries of coin and rectangular shapes exert the same effects.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte secondary battery comprising a chargeable and dischargeable cathode, a chargeable and dischargeable anode, and a non-aqueous electrolyte, said battery including a substance which produces water with an increase in temperature, wherein said substance comprises at least one hydroxide selected from the group consisting of zinc hydroxide, cadmium hydroxide, chromium hydroxide, cobalt hydroxide, nickel hydroxide, manganese hydroxide, zirconium hydroxide, iron hydroxide oxide, and nickel hydroxide oxide.

2. A non-aqueous electrolyte secondary battery in accordance with claim 1, wherein said substance which produces water with an increase in temperature is included in either one of said cathode and said anode, and a content of said substance is 0.5 to 20 parts by weight per 100 parts by weight of an active material of said corresponding electrode.

3. A non-aqueous electrolyte secondary battery in accordance with claim 1, wherein said substance which produces water with an increase in temperature is included in said non-aqueous electrolyte, and a content of said substance is 0.5 to 30 parts by weight per 100 parts by weight of said non-aqueous electrolyte.

4. A non-aqueous electrolyte secondary battery comprising a chargeable and dischargeable cathode, a chargeable and dischargeable anode, and a non-aqueous electrolyte, said battery including a substance which produces water with an increase in temperature, wherein said substance comprises at least one compound having water of crystallization, said compound selected from the group consisting of hydrous aluminum oxide, hydrous barium nitrate, hydrous calcium sulfate, hydrous cobalt phosphate, hydrous antimony oxide, hydrous tin oxide, hydrous titanium oxide, hydrous bismuth oxide, and hydrous tungsten oxide.

5. A non-aqueous electrolyte secondary battery in accordance with claim 4, wherein said substance which produces water with an increase in temperature is included in either one of said cathode and said anode, and a content of said substance is 0.5 to 20 parts by weight per 100 parts by weight of an active material of said corresponding electrode.

6. A non-aqueous electrolyte secondary battery in accordance with claim 4, wherein said substance which produces water with an increase in temperature is included in said non-aqueous electrolyte, and a content of said substance is 0.5 to 30 parts by weight per 100 parts by weight of said non-aqueous electrolyte.

\* \* \* \* \*